United States Patent
Lee et al.

(10) Patent No.: US 10,930,956 B2
(45) Date of Patent: Feb. 23, 2021

(54) LOW FLOW CONTROL METHOD AND SYSTEM FOR FUEL CELL

(71) Applicants: Hyundai Motor Company, Seoul (KR); Kia Motors Corporation, Seoul (KR)

(72) Inventors: Kyu Il Lee, Gyeonggi-do (KR); Seong Cheol Jeong, Gyeonggi-do (KR); Boung Ho Min, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 255 days.

(21) Appl. No.: 15/833,376

(22) Filed: Dec. 6, 2017

(65) Prior Publication Data
US 2019/0115607 A1 Apr. 18, 2019

(30) Foreign Application Priority Data
Oct. 16, 2017 (KR) .......... 10-2017-0133859

(51) Int. Cl.
| | |
|---|---|
| H01M 8/04746 | (2016.01) |
| H01M 8/04537 | (2016.01) |
| H01M 8/04828 | (2016.01) |
| H01M 8/043 | (2016.01) |
| H01M 8/04992 | (2016.01) |

(52) U.S. Cl.
CPC ....... *H01M 8/04746* (2013.01); *H01M 8/043* (2016.02); *H01M 8/0494* (2013.01); *H01M 8/04604* (2013.01); *H01M 8/04626* (2013.01); *H01M 8/04753* (2013.01); *H01M 8/04776* (2013.01); *H01M 8/04992* (2013.01)

(58) Field of Classification Search
None
See application file for complete search history.

(56) References Cited

U.S. PATENT DOCUMENTS

2017/0294666 A1* 10/2017 Kim .................. H01M 8/04303

FOREIGN PATENT DOCUMENTS

KR 2012-0014301 A 2/2012

* cited by examiner

*Primary Examiner* — Wyatt P McConnell
(74) *Attorney, Agent, or Firm* — Mintz Levin Cohn Ferris Glovsky and Popeo, P.C.; Peter F. Corless

(57) ABSTRACT

A low flow control method for a fuel cell includes: determining whether or not the fuel cell enters a low flow control mode, dividing a low flow control operation into a plurality of low flow control stages upon determining that the fuel cell enters the low flow control mode, and controlling a power generation quantity of the fuel cell according to the low flow control stages.

19 Claims, 9 Drawing Sheets

LOW FLOW CONTROL METHOD AND SYSTEM FOR FUEL CELL

CROSS-REFERENCE TO RELATED APPLICATION

This application claims under 35 U.S.C. § 119(a) the benefit of Korean Patent Application No. 10-2017-0133859, filed on Oct. 16, 2017 in the Korean Intellectual Property Office, the entire contents of which are incorporated herein by reference.

BACKGROUND

1. Technical Field

The present disclosure relates to a low flow control method and system for a fuel cell, and more particularly, to a method and system of controlling power generation of a fuel cell if a current requirement of the fuel cell is low.

2. Description of the Related Art

A fuel cell system applied to a fuel cell electric vehicle includes a fuel cell stack to generate electric energy through electrochemical reaction of reaction gases, a hydrogen supply device to supply hydrogen serving as fuel to the fuel cell stack, an air supply device to supply air including oxygen serving as an oxidizer necessary for the electrochemical reaction to the fuel cell stack, and a thermal management system to discharge heat, i.e., a by-product of the electrochemical reaction of the fuel cell stack, to the outside, to optimally control an operating temperature of the fuel cell stack and to perform a water management function.

In general, a fuel cell system includes the fuel cell stack to supply power through power generation from the electrochemical reaction between hydrogen and oxygen, and a high voltage battery which may be charged with power produced by the fuel cell stack or discharged so as to supply power to a motor.

FIG. 1 (RELATED ART) is a flowchart illustrating a conventional method of controlling a fuel cell in a normal state.

With reference to FIG. 1, a fuel cell electric vehicle generally calculates torque requested by a driver from input of an accelerator, etc. (step S110), and calculates required power of a motor (step S120). A current requirement of the fuel cell may be calculated by subtracting auxiliary current of a high voltage battery from required current of the motor (step S130).

Since required power of the motor is a value, acquired by multiplying the required current of the motor by voltage of a main bus terminal, the required current of the motor may be calculated by dividing the required power of the motor by the voltage of the main bus terminal.

In particular, since the auxiliary current of the high voltage battery is defined assuming that the high voltage battery is discharged to supplement the required power of the motor, in a state in which the high voltage battery has an insufficient state of charge (SOC) and is charged, the auxiliary current of the high voltage battery has a negative value, and thus the current requirement of the fuel cell may be calculated by adding charging current of the high voltage battery to the required current of the motor.

A flow rate of air supplied to a fuel cell stack is calculated according to calculated current requirement of the fuel cell (step S140). In particular, in order to supply the calculated flow rate of air to the fuel cell stack, instructions may be given to an air blower provided on an air supply line supplying air to the fuel cell stack so that an RPM of the air blower is controlled.

Thereby, available power of the fuel cell stack is calculated from the flow rate of air supplied to the fuel cell stack (step S150), and available power of the motor is calculated by adding available power of the battery to the available power of the fuel cell stack (step S160).

However, such control is properly carried out if the current requirement of the fuel cell, generated by the fuel cell stack, is a designated level or above. If the current requirement of the fuel cell is below the designated level, the fuel cell stack is exposed to a high voltage close to open circuit voltage (OCV), and thus durability of the fuel cell stack may be lowered, and when the air blower is controlled to supply a small amount of air, power consumption to power generation is increased and thus fuel efficiency may be lowered. Further, driver-requested torque is not properly implemented, and thus drivability may be lowered.

The above description has been provided to aid in understanding of the background of the present disclosure and should not be interpreted as conventional technology known to those skilled in the art.

SUMMARY

The present disclosure provides a method and system of controlling air supply and power distribution through optimal control in a low flow rate state of air supplied to a fuel cell.

In accordance with an aspect of the present disclosure, the above and other objects can be accomplished by the provision of a low flow control method for a fuel cell including determining whether or not a fuel cell enters a low flow control mode, dividing a low flow control operation into a plurality of low flow control stages, upon determining that the fuel cell enters the low flow control mode, and controlling a power generation quantity of the fuel cell according to the low flow control stages.

The determination as to whether or not the fuel cell enters the low flow control mode may include calculating a current requirement of the fuel cell, and if the calculated current requirement of the fuel cell is below a predetermined current quantity, it may be determined that the fuel cell enters the low flow control mode.

The determination as to whether or not the fuel cell enters the low flow control mode may further include monitoring a state of charge (SOC) of a high voltage battery, and if the monitored SOC of the high voltage battery is greater than a predetermined first SOC, it may be determined that the fuel cell enters the low flow control mode.

After the fuel cell enters the low flow control mode, if the SOC of the high voltage battery is the predetermined first SOC or below and thus the fuel cell is released from the low flow control mode, the fuel cell may re-enter the low flow control mode when the SOC of the high voltage battery is above a predetermined second SOC.

The division of the low flow control operation may include calculating required power of a motor, and the low flow control operation may be divided into a plurality of stages depending on the calculated required power of the motor.

The division of the low flow control operation may include monitoring a speed of a fuel cell electric vehicle, and the low flow control operation may be divided into a plurality of stages depending on the monitored speed of the fuel cell electric vehicle.

In the control of the power generation quantity of the fuel cell, an amount of air supplied to the fuel cell may be controlled.

In the division of the low flow control operation, the low flow control operation may be divided into three stages depending on a driving state of a fuel cell electric vehicle and, in the control of the power generation quantity of the fuel cell, an RPM of an air blower provided on an air supply line supplying air to the fuel cell may be controlled.

If the low flow control operation corresponds to a first stage in the division of the low flow control operation, the air blower may be controlled so as to be operated at a predetermined RPM depending on an SOC of a high voltage battery, in the control of the power generation quantity of the fuel cell.

If power consumed by high voltage accessories is a predetermined power or above, the air blower may be controlled so as to be operated at an RPM, acquired by adding a regular value to the predetermined RPM depending on the SOC of the high voltage battery.

If the low flow control operation corresponds to a second stage in the division of the low flow control operation, the air blower may be controlled so as to be operated at a predetermined RPM depending on a current requirement of the fuel cell, in the control of the power generation quantity of the fuel cell.

A plurality of predetermined RPMs depending on the current requirement of the fuel cell may be prepared, and the air blower may be controlled so as to be operated at one selected from the predetermined RPMs according to an SOC of a high voltage battery.

If the low flow control operation corresponds to a third stage in the division of the low flow control operation, the air blower may be controlled so as to be operated at a predetermined RPM depending on required current of the motor, in the control of the power generation quantity of the fuel cell.

A plurality of predetermined RPMs depending on the required current of the motor may be prepared, and the air blower may be controlled so as to be operated at one selected from the predetermined RPMs according to an SOC of a high voltage battery.

In the control of the power generation quantity of the fuel cell, the fuel cell may enter a recovery mode for a predetermined time and, then, the power generation quantity of the fuel cell may be again controlled according to the low flow control stages, on a predetermined cycle.

In the recovery mode, an air blower provided on an air supply line supplying air to the fuel cell may be controlled so as to be operated at a predetermined RPM depending on an SOC of a high voltage battery.

The low flow control method for a fuel cell may further include controlling charging/discharging power of a high voltage battery, after the control of the power generation quantity of the fuel cell, and in control of charging/discharging power of the high voltage battery, a gain value used to calculate the charging/discharging power of the high voltage battery may be varied according to an SOC of the high voltage battery.

In the control of the power generation quantity of the fuel cell, if required power of a motor is greater than the sum of generated power of the fuel cell and limited power of a high voltage battery, the limited power of the high voltage battery may be increased by a predetermined value.

In accordance with another aspect of the present disclosure, there is provided a low flow control system for a fuel cell includes the fuel cell, an air blower provided on an air supply line supplying air to the fuel cell, and a controller configured to determine whether or not the fuel cell enters a low flow control mode, dividing a low flow control operation into a plurality of low flow control stages upon determining that the fuel cell enters the low flow control mode, and controlling an RPM of the air blower according to the low flow control stages.

In accordance with another aspect of the present disclosure, there is provided a non-transitory computer readable medium containing program instructions executed by a processor, the computer readable medium comprising: program instructions that determine whether or not a fuel cell enters a low flow control mode; program instructions that divide a low flow control operation into a plurality of low flow control stages and determine the low flow control stages, upon determining that the fuel cell enters the low flow control mode; and program instructions that control a power generation quantity of the fuel cell according to the determined low flow control stages.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
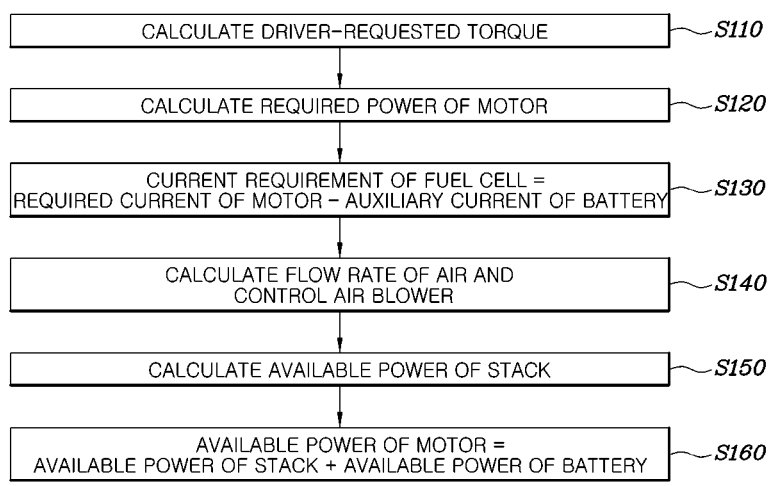
FIG. 1 (RELATED ART) is a flowchart illustrating a conventional method of controlling a fuel cell in a normal state.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments.

Terms "first", "second", etc. may be used to describe various elements, but the elements are not limited by the terms. These terms are used only to discriminate one element from other elements. For example, a first element may be named a second element without departing from the scope and spirit of the disclosure and, similarly, a second element may be named a first element.

In the following description of the embodiments, it will be understood that, when an element is "connected to" or "coupled with" another element, the element may be connected directly to or coupled directly with the other element or other elements may be interposed between both elements. However, it will be understood that, when an element is "directly connected to" or "directly coupled with" another element, no element may be interposed between both elements. Other expressions describing relations between elements, i.e., "between" and "directly between", and "adjacent to" and "directly adjacent to", should be interpreted in the same manner.

Reference will now be made in detail to the preferred embodiments of the present disclosure, examples of which are illustrated in the accompanying drawings. Wherever possible, the same reference numbers will be used throughout the drawings to refer to the same or like parts.

Figure 2:
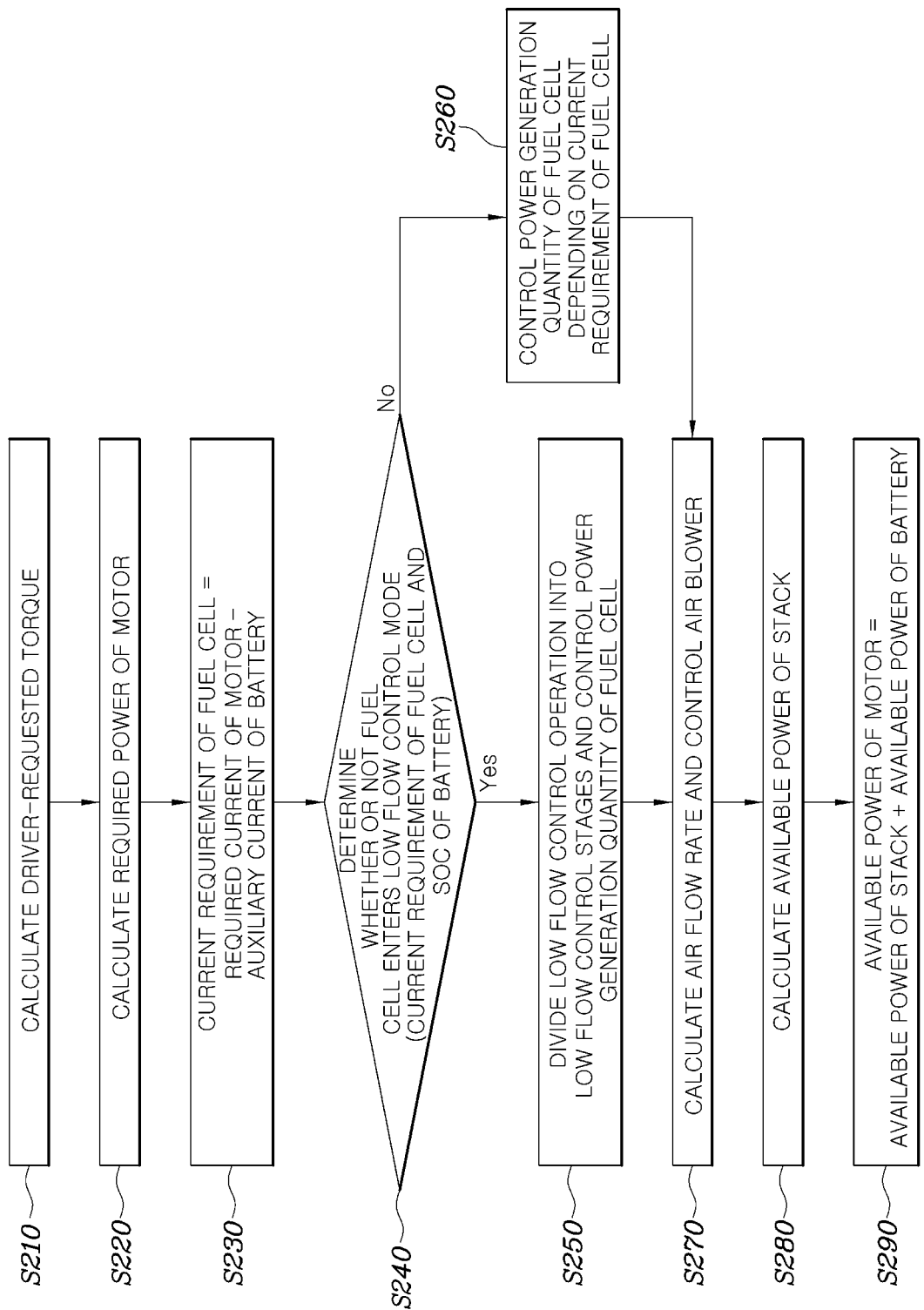
FIG. 2 is a flowchart illustrating a low flow control method disclosure in accordance with one embodiment of the present disclosure.

FIG. 2 is a flowchart illustrating a low flow control method for a fuel cell in accordance with one embodiment of the present disclosure.

With reference to FIG. 2, a low flow control method for a fuel cell includes determining whether or not a fuel cell enters a low flow control mode (step S240), dividing a low flow control operation into a plurality of low flow control stages, upon determining that the fuel cell enters the low flow control mode, and controlling a power generation quantity of the fuel cell according to the low flow control stages (step S250).

Determination as to whether or not the fuel cell enters the low flow control mode (step S240) may include calculating a current requirement of the fuel cell (step S230), and if the calculated current requirement of the fuel cell is below a predetermined current quantity, it is determined that the fuel cell enters the low flow control mode. In particular, driver-requested torque is calculated (step S210), required power of a motor is calculated thereby (step S220), and the current requirement of the fuel cell is calculated by subtracting auxiliary current of a high voltage battery from required current of the motor depending on the required power of the motor (step S230).

Further, determination as to whether or not the fuel cell enters the low flow control mode (step S240) may further include monitoring a state of charge (SOC) of the high voltage battery, and if the monitored SOC of the high voltage battery is greater than a predetermined first SOC, it is determined that the fuel cell enters the low flow control mode.

That is, if in a hybrid mode in which all of the fuel cell, the high voltage battery and a bidirectional high voltage DC/DC converter (BHDC) provided therebetween are normally operated, the current requirement of the fuel cell is low, and an SOC of the high voltage battery is high. Thus, it is necessary to maintain a low power generation quantity of a fuel cell stack, and the fuel cell enters the low flow control mode.

For example, a case that the current requirement of the fuel cell is below 30 A and the SOC of the high voltage battery is 45% or above may be set as a condition that the fuel cell enters the low flow control mode.

Further, since the power generation quantity of the fuel cell is not maintained at a low value in a cold starting state of the fuel cell, the fuel cell may enter the low flow control mode only if cold starting requirements of the fuel cell are not satisfied.

On the other hand, a case that the SOC of the high voltage battery is below 45%, a case that the fuel cell deviates from the hybrid mode, i.e., is in an FC only mode (i.e., a mode in which a fuel cell electric vehicle is driven only by power generated by the fuel cell) or a case that the current requirement of the fuel cell is 30 A or above may be set as a condition that the fuel cell is released from the low flow control mode.

After the fuel cell enters the low flow control mode, if the SOC of the high voltage battery is a predetermined first SOC or below and thus the fuel cell is released from the low flow control mode, the fuel cell again enters the low flow control mode when the SOC of the high voltage battery is above a predetermined second SOC. In particular, the second SOC may be set to be greater than the first SOC.

For example, after the fuel cell enters the low flow control mode, if the SOC of the high voltage battery is below 45% and thus the fuel cell is released from the low flow control mode, the power generation quantity of the fuel cell may be increased so as to charge the high voltage battery. Thereafter, just when the SOC of the high voltage battery is increased to 45% or above, the fuel cell re-enters the low flow control mode and thereby entry and release of the fuel cell into and from the low flow control mode are continuously repeated. Therefore, a case that the SOC of the high voltage battery is 55% or above may be set as a condition that the fuel cell enters the low flow control mode. That is, a kind of hysteresis section is provided.

If the fuel cell enters the low flow control mode, division of the low flow control operation (step S250) may include calculating the required power of the motor and the low flow control operation may be divided into a plurality of stages depending on the calculated required power of the motor, or division of the low flow control operation (step S250) may include monitoring a speed of a fuel cell electric vehicle and the low flow control operation is divided into a plurality of stages depending on the monitored speed of the fuel cell electric vehicle.

The low flow control operation may be divided into a plurality of stages based on required power of the motor. For example, 5 kW, 10 kW and 15 kW may be set reference values, the low flow control operation may correspond to a first stage if the required power of the motor is below 5 kW, the low flow control operation may correspond to a second stage if the required power of the motor is 5 kW or above and below 10 kW, the low flow control operation may correspond to a third stage if the required power of the motor is 10 kW or above and below 15 kW. If the required power of the motor is 15 kW or above, the fuel cell may be released from the low flow control mode.

Hysteresis sections are provided among the first stage, the second stage, the third stage and a low flow control mode release condition. In particular, transition from the second stage to the first stage may occur if the required power of the motor is below 3 kW, transition from the third stage to the second stage may occur if the required power of the motor is below 8 kW, and the fuel cell in a low flow control mode release stage may re-enter the low flow control mode if the required power of the motor is below 13 kW.

In accordance with another embodiment, the low flow control operation may be divided into a plurality of stages based on a speed of the fuel cell electric vehicle. For example, 10 kph, 20 kph and 30 kph may be set as reference values, the low flow control operation may correspond to a first stage if the vehicle speed is below 10 kph, the low flow control operation may correspond to a second stage if the vehicle speed is 10 kph or above and below 20 kph, and the low flow control operation may correspond to a third stage if the vehicle speed is 20 kph or above and below 30 kph. If the vehicle speed is 30 kph or above, the fuel cell may be released from the low flow control mode.

In the same manner, hysteresis sections are provided among the first stage, the second stage, the third stage and a low flow control mode release condition. In particular, transition from the second stage to the first stage may occur if the vehicle speed is below 7 kph, transition from the third stage to the second stage may occur if the vehicle speed is below 17 kph, and the fuel cell in the low flow control mode release stage may re-enter the low flow control mode if the vehicle speed is below 27 kph.

Therefore, a low flow control method and a BHDC voltage control method are varied according to low flow control stages in division of the low flow control operation (step S250) so that fuel efficiency is maintained and driving performance is maintained at each stage. For example, the low flow control operation is divided into three stages according to low flow rates such that, as a low flow rate is increased, the low flow control operation becomes close to the first stage, but those skilled in the art will appreciate that the number of low flow control stages may be various and the order of the low flow control stages may be reversed.

In the present disclosure, the first to third stages are set such that an amount of air supplied to the fuel cell stack is decreased in a direction from the third stage to the first stage.

In control of the power generation quantity of the fuel cell (step S250), an amount of air supplied to the fuel cell may be controlled (step S270). Further, in control of the power generation quantity of the fuel cell (step S250), an RPM of an air blower provided on an air supply line supplying air to the fuel cell may be controlled (step S270). Although control of the RPM of the air blower is described herein, an RPM of an air compressor to supply air to the fuel cell stack may be controlled.

If the fuel cell does not enter the low flow control mode, the fuel cell is in the normal control state and thus the power generation quantity of the fuel cell is controlled depending on the current requirement of the fuel cell, in the same manner as in the conventional method (step S260). Thereafter, an amount of air supplied to the fuel cell may be calculated and thereby an RPM of the air blower provided on the air supply line supplying air to the fuel cell may be controlled (step S270).

Available power of the fuel cell stack is determined depending on the controlled RPM of the air blower (step S280), and available power of the motor is calculated by adding available power of the battery to the available power of the fuel cell stack (step S290).

Figure 3:
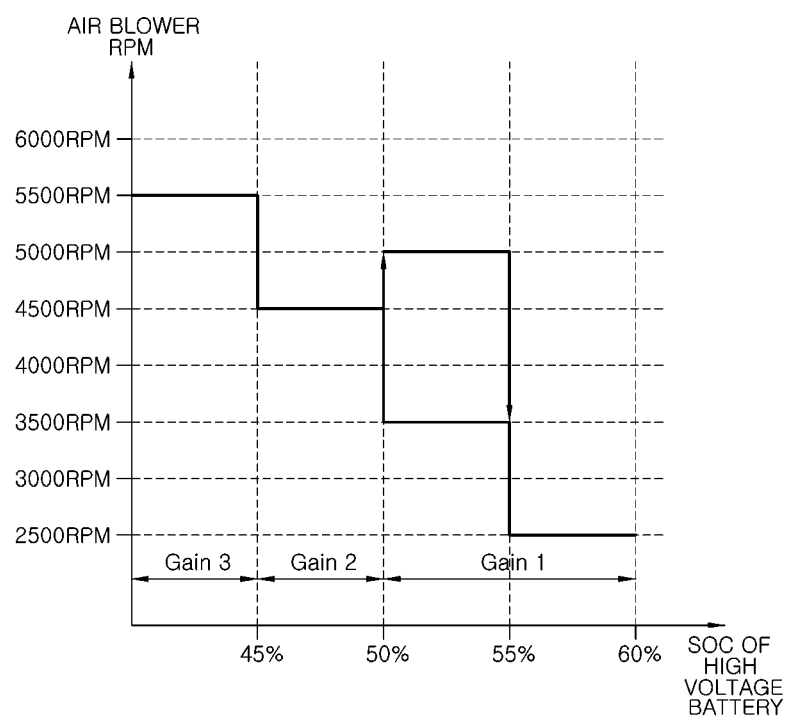
FIG. 3 is a control map of an air blower if a low flow control operation of the fuel cell in accordance with one embodiment of the present disclosure corresponds to a first stage.

FIG. 3 is a control map of the air blower if the low flow control operation of the fuel cell in accordance with one embodiment of the present disclosure corresponds to the first stage.

With reference to FIG. 3, if the low flow control operation corresponds to the first stage in division of the low flow control operation, in control of the power generation quantity of the fuel cell, the air blower may be controlled so as to be operated at a predetermined RPM depending on the SOC of the high voltage battery.

That is, in the first stage in which the air blower is controlled to have the lowest air flow rate, the air blower may be controlled so as to be operated at an RPM in a predetermined map depending on the SOC of the high voltage battery. As the SOC of the high voltage battery is increased, the power generation quantity of the fuel cell is decreased and, thus, the air blower may be controlled so as to have a low RPM. For example, as exemplarily shown in FIG. 3, the air blower may be controlled so as to be operated at a predetermined RPM, i.e., at 5,500 RPM if the SOC of the high voltage battery is below 45%, at 4,500 RPM if the SOC of the high voltage battery is 45% or above and below 50%, at 3,500 RPM if the SOC of the high voltage battery is 50% or above and below 55%, and at 2,500 RPM if the SOC of the high voltage battery is 55% or above.

For example, if power consumed by high voltage accessories is a predetermined power or above, the air blower may be controlled so as to be operated at an RPM acquired by adding a regular value to a predetermined RPM depending on the SOC of the high voltage battery. In particular, if power consumed by high voltage accessories, i.e., consumed due to operation of an air conditioner or a PTC, is a predetermined power (for example, 200 W) or above, the air blower may be controlled so as to be operated at an RPM acquired by adding a regular value (for example, 1,500 RPM) to an RPM depending on a predetermined map. Such control may be restricted to until the SOC of the high voltage battery is 55% or above.

Figure 4:
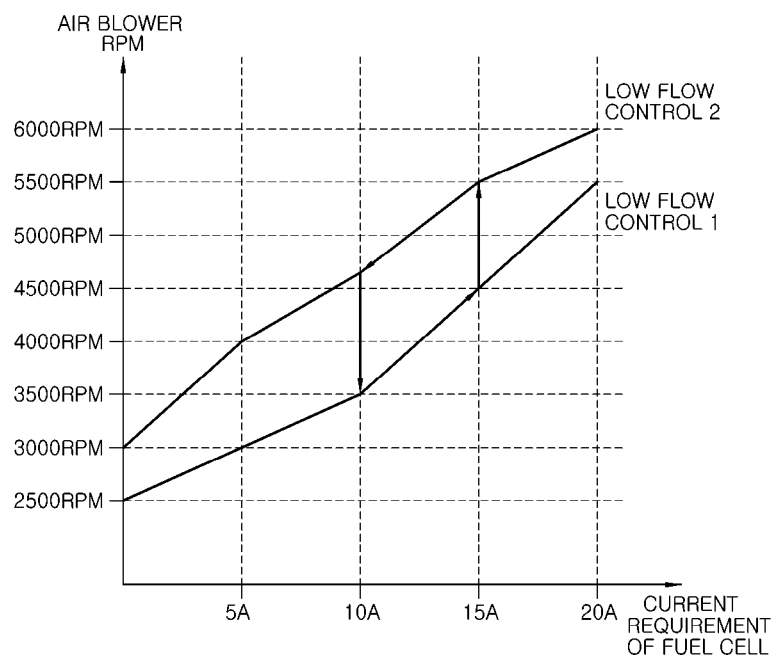
FIG. 4 is a control map of the air blower if the low flow control operation of the fuel cell in accordance with one embodiment of the present disclosure corresponds to a second stage.
Figure 5:
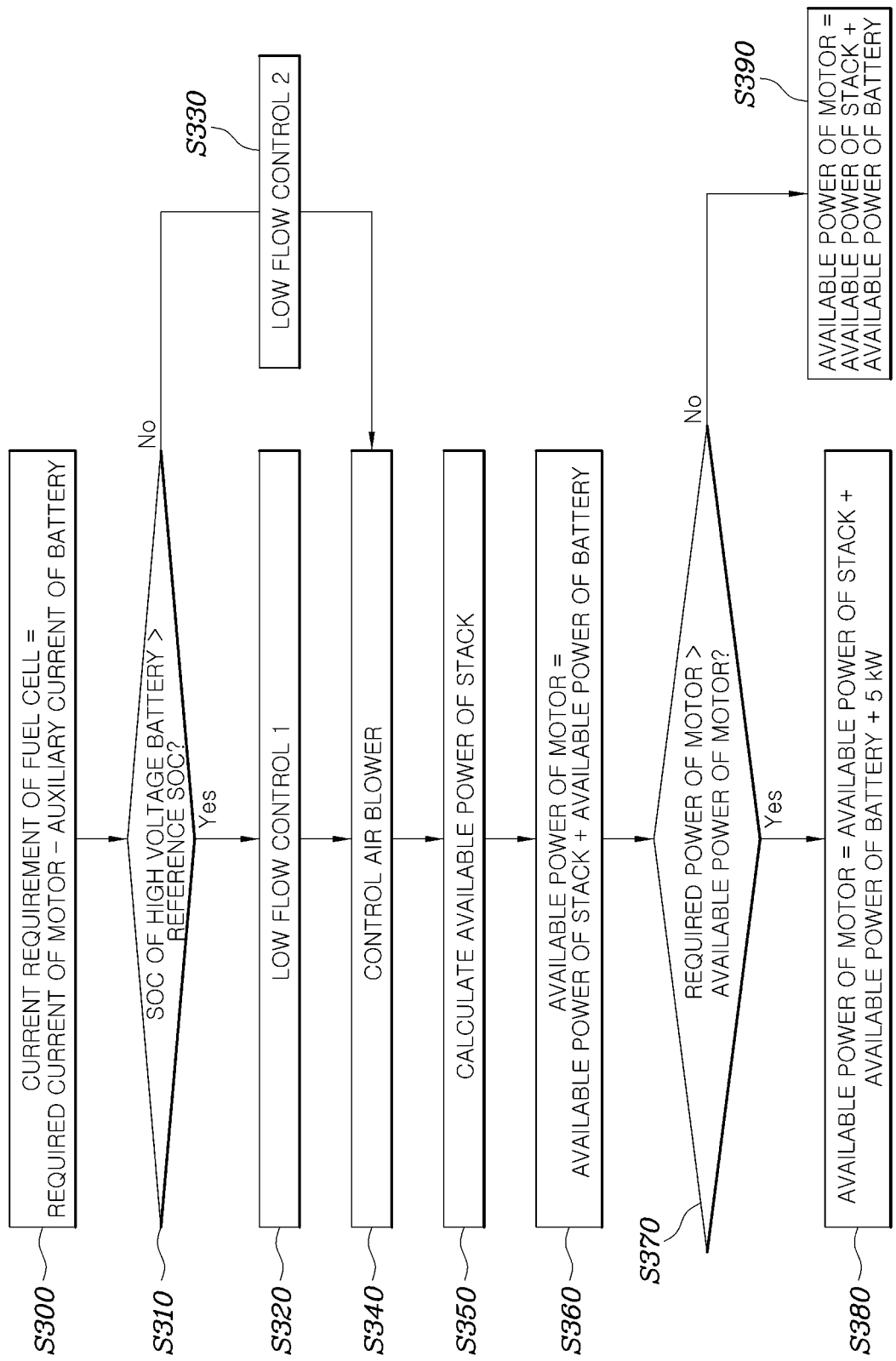
FIG. 5 is a flowchart illustrating a process of controlling the air blower if the low flow control operation of the fuel cell in accordance with one embodiment of the present disclosure corresponds to the second stage.

FIG. 4 is a control map of the air blower if the low flow control operation of the fuel cell in accordance with one embodiment of the present disclosure corresponds to the second stage, and FIG. 5 is a flowchart illustrating a process of controlling the air blower if the low flow control operation of the fuel cell in accordance with one embodiment of the present disclosure corresponds to the second stage.

With reference to FIGS. 4 and 5, if the low flow control operation corresponds to the second stage in division of the low flow control operation, in control of the power generation quantity of the fuel cell, the air blower may be controlled so as to be operated at a predetermined RPM depending on a current requirement of the fuel cell (step S340).

In particular, the current requirement of the fuel cell may be defined as a value acquired by subtracting auxiliary current of the high voltage battery from the required current of the motor (step S300).

A plurality of predetermined RPMs depending on the current requirement of the fuel cell may be prepared (low flow control 1 (step S320) and low flow control 2 (step S330)), and the air blower may be controlled so as to be operated at one selected from the predetermined RPMs according to the SOC of the high voltage battery (step S340).

In the present disclosure, two predetermined RPM maps depending on the current requirement of the fuel cell may be prepared (low flow control 1 (step S320) and low flow control 2 (step S330)), one of the two maps may be selected according to the SOC of the high voltage battery (step S310), and the air blower may be controlled so as to be operated at an RPM in the selected map depending on the current requirement of the fuel cell (step S340).

In particular, a reference SOC of the high voltage battery may be set to, for example, 50%, and, if the SOC of the high voltage battery is 50% or above, the map of low flow control 1 may be selected and the air blower may be controlled so as to be operated at an RPM in the selected map depending on the current requirement of the fuel cell, and, if the SOC of the high voltage battery is below 50%, the map of low flow control 2 may be selected and the air blower may be controlled so as to be operated at an RPM in the selected map depending on the current requirement of the fuel cell. Here, a hysteresis section, for example, a section which is within 5%, may be provided and, if the SOC of the high voltage battery is below 50% and thus the air blower is controlled according to the map of low flow control 2, when the SOC of the high voltage battery becomes 55% or above, the air blower may be controlled according to the map of low flow control 1.

Figure 6:
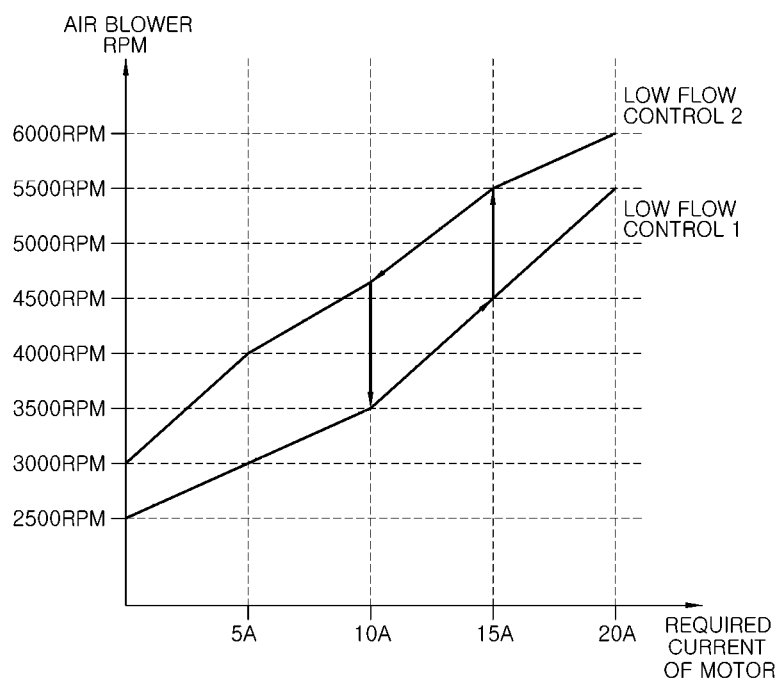
FIG. 6 is a control map of the air blower if the low flow control operation of the fuel cell in accordance with one embodiment of the present disclosure corresponds to a third stage.
Figure 7:
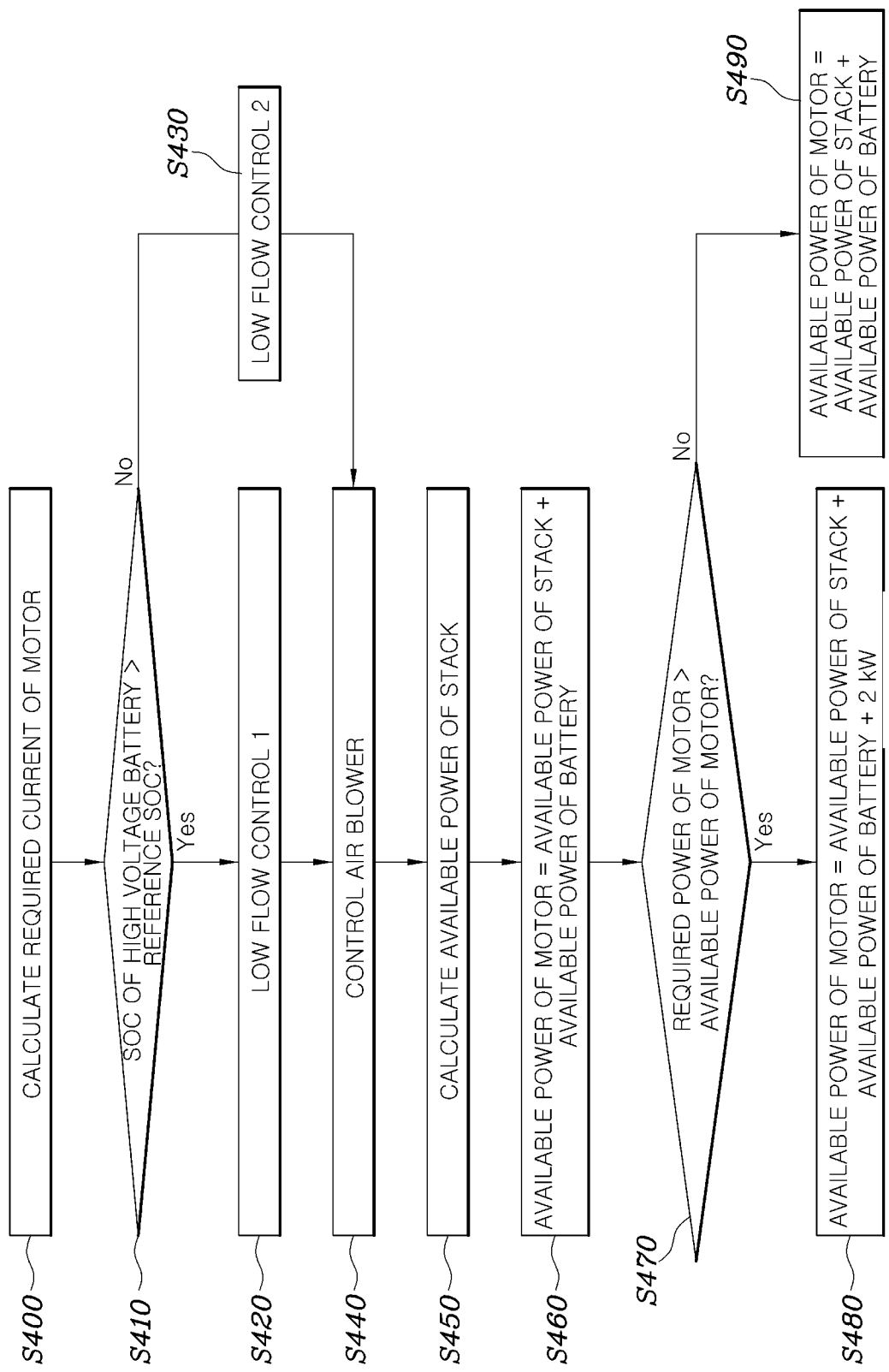
FIG. 7 is a flowchart illustrating a process of controlling the air blower if the low flow control operation of the fuel cell in accordance with one embodiment of the present disclosure corresponds to the third stage.

FIG. 6 is a control map of the air blower if the low flow control operation of the fuel cell in accordance with one embodiment of the present disclosure corresponds to the third stage, and FIG. 7 is a flowchart illustrating a process of controlling the air blower if the low flow control operation of the fuel cell in accordance with one embodiment of the present disclosure corresponds to the third stage.

With reference to FIGS. 6 and 7, if the low flow control operation corresponds to the third stage in division of the low flow control operation, in control of the power generation quantity of the fuel cell, the air blower may be controlled so as to be operated at a predetermined RPM depending on required current of the motor (step S440).

A plurality of predetermined RPMs depending on the required current of the motor may be prepared (low flow control 1 (step S420) and low flow control 2 (step S430)), one of the RPMs may be selected according to the SOC of the high voltage battery (step S410), and the air blower may be controlled so as to be operated at the selected RPM (step S440).

Control of the air blower in the third stage is similar to control of the air blower in the second stage except that the current requirement of the fuel cell, i.e., a value acquired by subtracting the auxiliary current of the high voltage battery from the required current of the motor, is used as a criterion to control the air blower in the second stage but the required current of the motor is used in the third stage (step S400). Further, the same predetermined maps may be used in the second stage and the third stage but different x-axis variables may be used in the second stage and the third stage. Therefore, a description of parts in control of the air blower in the third stage which is the same as parts in control of the air blower in the second stage will be omitted.

Since the required current of the motor in the third stage is greater than the current requirement of the fuel cell in the second stage by the auxiliary current of the high voltage battery, even under the same conditions, the air blower may be controlled so as to be operated at a higher RPM in the third stage than in the second stage.

Figure 8:
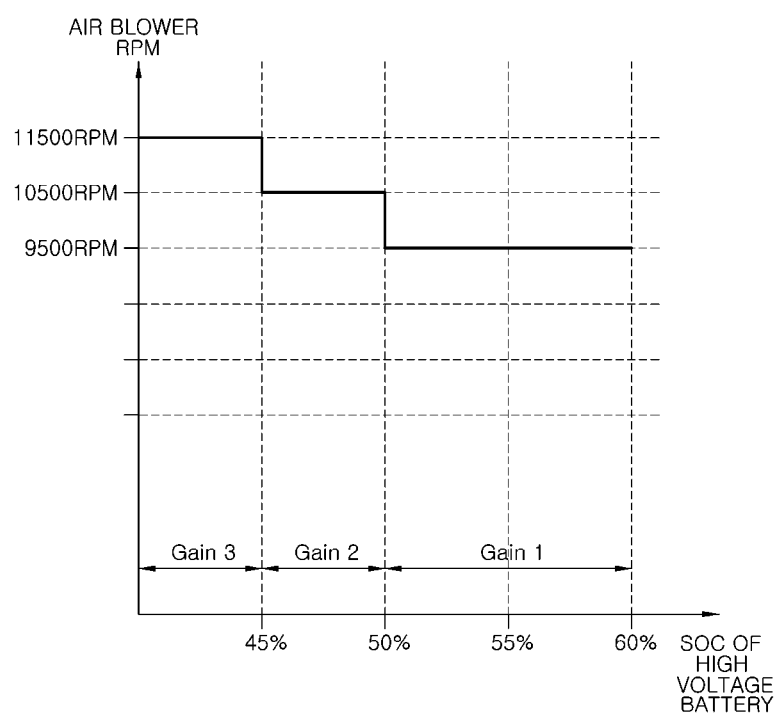
FIG. 8 is a control map of the air blower in a low flow control recovery mode of the fuel cell in accordance with one embodiment of the present disclosure.

FIG. 8 is a control map of the air blower in a low flow control recovery mode of the fuel cell in accordance with one embodiment of the present disclosure.

With reference to FIG. 8, in control of the power generation quantity of the fuel cell, the fuel cell may enter the recovery mode for a predetermined time, and then the power generation quantity of the fuel cell may be again controlled according to the low flow control stages, on a predetermined cycle.

In the recovery mode, the air blower provided on the air supply line supplying air to the fuel cell may be controlled so as to be operated at a predetermined RPM depending on the SOC of the high voltage battery.

That is, as a designated time T1 passes after the fuel cell enters the low flow control mode, the fuel cell may enter the recovery mode in which the air blower is controlled so as to be operated a fixed RPM for a predetermined time T2, and then the power generation quantity of the fuel cell may be again controlled according to the low flow control stages. In particular, the fixed RPM may be set to a different value depending on the SOC of the high voltage battery, and the air blower may be controlled so as to be operated at a higher RPM in the recovery mode than in the low flow control mode.

For example, the air blower may be controlled so as to be operated at a fixed RPM, i.e., at 11,500 RPM if the SOC of the high voltage battery is below 45%, at 10,500 RPM if the SOC of the high voltage battery is 45% or above and below 50%, and at 9,500 RPM if the SOC of the high voltage batter is 50% or above.

With reference to FIGS. 3 and 8, the low flow control method for a fuel cell further includes controlling charging/discharging power of the high voltage battery, after control of the power generation quantity of the fuel cell, and in control of charging/discharging power of the high voltage battery, a gain value used to calculate charging/discharging power of the high voltage battery may be varied according to the SOC of the high voltage battery.

As the power generation quantity of the fuel cell is controlled, power generated by the fuel cell may be set and thereby charging or discharging power of the high voltage battery may be controlled. For this purpose, the charging or discharging power of the high voltage battery may be calculated using a difference between a target SOC of the high voltage battery and a current SOC of the high voltage battery. Here, a gain meaning weighting of such a difference may be varied.

In particular, for example, the target SOC of the high voltage battery may be set to 60%, the high voltage battery needs to be charged if the current SOC of the high voltage battery is less than 60%, and the charging power of the high voltage battery may be calculated by multiplying a difference between the target SOC and the current SOC of the high voltage battery by a gain.

If the power generation quantity of the fuel cell is controlled through the low flow control method of the present disclosure, the power generation quantity of the fuel cell is small, as compared to a power generation quantity of the fuel cell in a normal state, and thus charging of the high voltage battery may slow down or the high voltage battery may be discharged, as compared to normal flow rate control. Therefore, simultaneously with controlling the RPM of the air blower, by varying the gain used to calculate the charging/discharging power of the high voltage battery, the charging rate of the high voltage battery may be raised to a level similar to that of the high voltage battery in the normal state.

Specifically, the gain used to calculate the charging/discharging power of the high voltage battery may be varied only if the current SOC of the high voltage battery is less than the target SOC and thus the high voltage battery is charged. Such a situation is divided into a section in which the SOC of the high voltage battery is above 50%, a section in which the SOC of the high voltage battery is 45% or above and below 50%, and a section in which the SOC of the high voltage battery is below 45%, and the respective sections may be controlled such that gain 1, gain 2 and gain 3 may be maintained. For example, gain 1, gain 2 and gain 3 may be respectively set to 40, 60 and 80 such that a gain value may be increased as the SOC of the high voltage battery is decreased.

Referring again to FIGS. 5 and 7, in control of the power generation quantity of the fuel cell (steps S340 and S440), if required power of the motor is greater than the sum of generated power of the fuel cell and limited power of the high voltage battery, the limited power of the high voltage battery may be increased by a predetermined value (steps S380 and S480).

As the power generation quantity of the fuel cell is controlled (steps S340 and S440), available power of the fuel cell may be set (steps S350 and S450). Available power of the motor may be set to a value acquired by adding the limited power of the high voltage battery to the available power of the fuel cell (steps S360 and S460). Thereafter, the available power of the motor is compared with the required power of the motor (steps S370 and S470), and if the required power of the motor is the available power of the motor or below, the available power of the motor may be set as it is, i.e., to a value acquired by adding the limited power of the high voltage battery to the available power of the fuel cell (steps S390 and S490).

However, if the required power of the motor is above the available power of the motor, oscillation in torque generated by the motor occurs due to insufficient current in the motor, and thus driving performance and drivability of the fuel cell electric vehicle may be lowered.

Therefore, the limited power of the high voltage battery is increased by a predetermined value and thus increases the available power of the motor so as to be greater than the required power of the motor (step S380 and S480), thereby being capable of improving driving performance and drivability of the fuel cell electric vehicle.

In particular, the available power of the fuel cell is set by a flow rate of air supplied to the fuel cell according to the RPM of the air blower controlled in control of the power generation quantity of the fuel cell (steps S340 and S440). The limited power of the high voltage battery is limited power depending on boost current limit of the BHDC, and in low flow control, for example, if boot current limit is set to 20 A, the average voltage of the high voltage battery becomes 180 V and thus the limited power of the high voltage battery is set to about 3.6 kW.

That is, increase in the limited power of the high voltage battery means increase in the boost current limit of the BHDC, increase in the limited power of the high voltage battery by 2 kW means that the boost current limit is increased by about 11 A (2 kW/180 V=11 A), and increase in the limited power of the high voltage battery by 5 kW means that the boost current limit is increased by about 28 A (5 kW/180 V=28 A).

In the second stage, the limited power of the high voltage battery may be increased by 5 kW (step S380) and, in the third stage, the limited power of the high voltage battery may be increased by 2 kW (step S480). In particular, these power values are experimentally acquired so as to improve driving performance. In the third stage, the RPM of the air blower is controlled according to required current of the motor which is greater than a current requirement of the fuel cell, and thus high available power of the fuel cell is calculated, as compared to the second stage. Therefore, in the third stage, even if the limited power of the high voltage battery is increased by a smaller value, lowering of driving performance may be sufficiently prevented.

Figure 9:
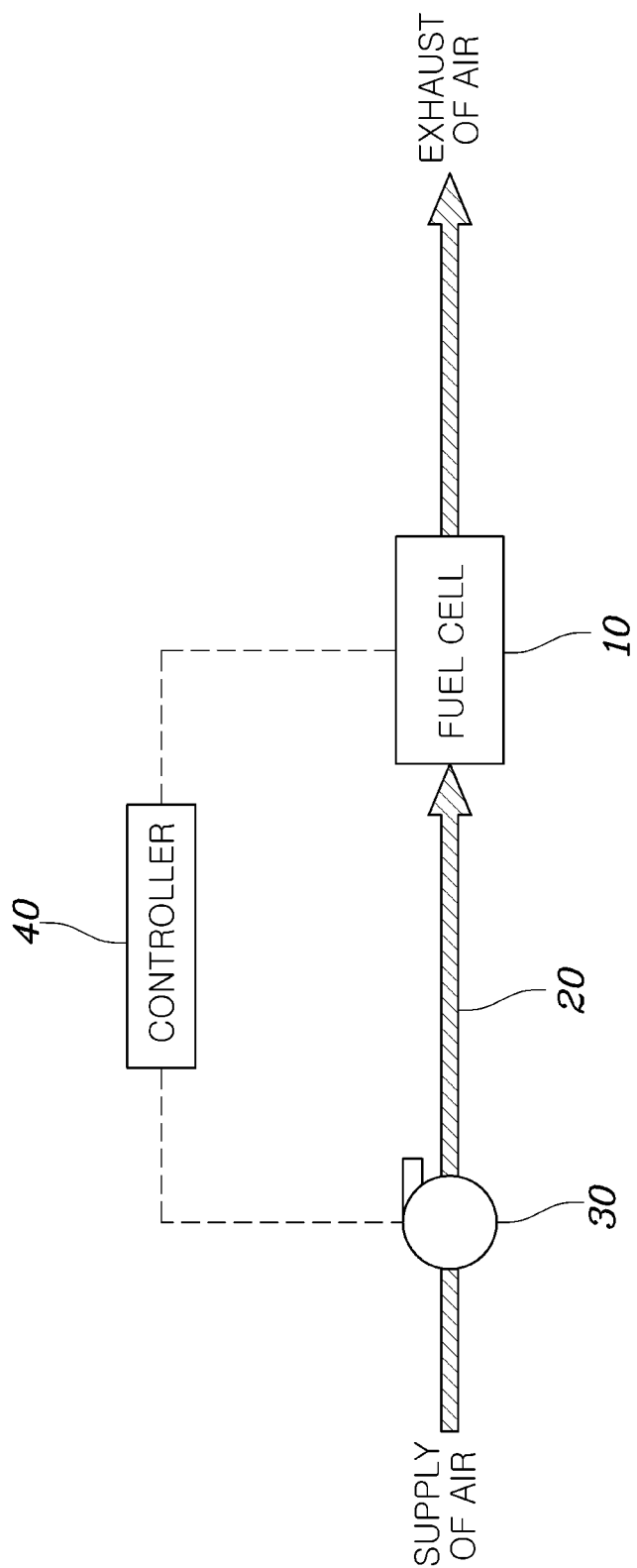
FIG. 9 is a schematic view illustrating the configuration of a low flow control system for a fuel cell in accordance with one embodiment of the present disclosure.

FIG. 9 is a schematic view illustrating the configuration of a low flow control system for a fuel cell in accordance with one embodiment of the present disclosure.

With reference to FIG. 9, a low flow control system for a fuel cell in accordance with one embodiment of the present disclosure includes a fuel cell 10, an air blower 30 provided on an air supply line 20 supplying air to the fuel cell 10, and a controller 40 to determine whether or not the fuel cell 10 enters a low flow control mode, dividing a low flow control operation into a plurality of low flow control stages upon determining that the fuel cell 10 enters the low flow control mode, and controlling an RPM of the air blower 30 according to the low flow control stages.

Although not shown in the drawings, the controller 40 may receive a signal through torque of a motor (not shown) or an opening rate of an accelerator (not shown) and thus control an RPM of the air blower 30.

A description of parts of the low flow control system for a fuel cell, which are the same as those of the above-described low flow control method for a fuel cell, will be omitted.

As is apparent from the above description, a low flow control method and system for a fuel cell in accordance with the present disclosure prevent a fuel cell stack from being exposed to high voltage close to OCV and may thus improve durability of the fuel cell stack.

Further, the low flow control method for a fuel cell in accordance with the present disclosure reduces power consumption of an air blower supplying air at a low flow rate, as compared to a conventional control method, and may thus improve fuel efficiency of a fuel cell electric vehicle.

Moreover, the low flow control method and system for a fuel cell in accordance with the present disclosure may improve drivability through optimal power distribution even in low flow control of a fuel cell.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A flow control method for a fuel cell when flow of the fuel cell is lower than a preset value, comprising:
   determining, by a controller, whether or not the fuel cell enters a flow control mode including a plurality of flow control stages, which are configured to control a flow rate state of air supplied to the fuel cell, depending on a calculated required power of a motor or a monitored speed of a fuel cell electric vehicle;
   determining, by the controller, the flow control stages, upon determining that the fuel cell enters the flow control mode; and
   controlling, by the controller, a power generation quantity of the fuel cell according to the determined flow control stages by controlling an amount of air supplied to the fuel cell.

2. The flow control method according to claim 1, wherein the determination as to whether or not the fuel cell enters the flow control mode comprises calculating a current requirement of the fuel cell,
   wherein, if the calculated current requirement of the fuel cell is below a predetermined current quantity, it is determined that the fuel cell enters the flow control mode.

3. The flow control method according to claim 2, wherein the determination as to whether or not the fuel cell enters the flow control mode further comprises monitoring a state of charge (SOC) of a high voltage battery,
   wherein, if the monitored SOC of the high voltage battery is greater than a predetermined first SOC, it is determined that the fuel cell enters the flow control mode.

4. The flow control method according to claim 3, wherein, after the fuel cell enters the flow control mode, if the SOC of the high voltage battery is the predetermined first SOC or below and thus the fuel cell is released from the flow control mode the power generation quantity of the fuel cell is increased to charge the high voltage battery.

5. The flow control method according to claim 1, wherein:
   the determining of the flow control stages comprises calculating required power of the motor; and
   the flow control stages are divided into a plurality of stages depending on the calculated required power of the motor.

6. The flow control method according to claim 1, wherein:
   the determining of the flow control stages comprises monitoring a speed of the fuel cell electric vehicle;
   the flow control stages are divided into a plurality of stages depending on the monitored speed of the fuel cell electric vehicle.

7. The flow control method according to claim 1, wherein:
   in the determining of the flow control stages, the flow control stages are divided into three stages depending on a driving state of the fuel cell electric vehicle; and
   in the control of the power generation quantity of the fuel cell, an RPM of an air blower provided on an air supply line supplying air to the fuel cell is controlled.

8. The flow control method according to claim 7, wherein, if one of the flow control stages corresponds to a first stage in the determining of the flow control stages, the air blower is controlled so as to be operated at a predetermined RPM depending on an SOC of a high voltage battery, in the control of the power generation quantity of the fuel cell.

9. The flow control method according to claim 8, wherein, if power consumed by high voltage accessories is a predetermined power or above, the air blower is controlled so as to be operated at an RPM, acquired by adding a specific value to the predetermined RPM depending on the SOC of the high voltage battery.

10. The flow control method according to claim 7, wherein, if the flow control operation corresponds to a second stage in the division of the flow control operation, the air blower is controlled so as to be operated at a predetermined RPM depending on a current requirement of the fuel cell, in the control of the power generation quantity of the fuel cell.

11. The flow control method according to claim 10, wherein a plurality of predetermined RPMs depending on the current requirement of the fuel cell is prepared, and the air blower is controlled so as to be operated at one selected from the predetermined RPMs according to an SOC of a high voltage battery.

12. The flow control method according to claim 7, wherein, if the flow control operation corresponds to a third stage in the division of the flow control operation, the air blower is controlled so as to be operated at a predetermined RPM depending on required current of the motor, in the control of the power generation quantity of the fuel cell.

13. The flow control method according to claim 12, wherein a plurality of predetermined RPMs depending on the required current of the motor is prepared, and the air blower is controlled so as to be operated at one selected from the predetermined RPMs according to an SOC of a high voltage battery.

14. The flow control method according to claim 1, wherein, in the controlling of the power generation quantity of the fuel cell, the fuel cell enters a recovery mode for a predetermined time on a predetermined cycle and, then, the power generation quantity of the fuel cell is again controlled.

15. The flow control method according to claim 14, wherein, in the recovery mode, an air blower provided on an air supply line supplying air to the fuel cell is controlled so as to be operated at a predetermined RPM depending on an SOC of a high voltage battery.

16. The flow control method according to claim 1, further comprising controlling charging/discharging power of a high voltage battery, after the control of the power generation quantity of the fuel cell,
   wherein, in the control of charging/discharging power of the high voltage battery, a gain value used to calculate the charging/discharging power of the high voltage battery is varied according to an SOC of the high voltage battery.

17. The flow control method according to claim 1, wherein, in the control of the power generation quantity of the fuel cell, if required power of a motor is greater than the sum of generated power of the fuel cell and limited power of a high voltage battery, the limited power of the high voltage battery is increased by a predetermined value.

18. A flow control system for a fuel cell when flow of the fuel cell is lower than a preset value, comprising:
   the fuel cell;
   an air blower provided on an air supply line supplying air to the fuel cell; and
   a controller configured to determine whether or not the fuel cell enters a flow control mode including a plurality of flow control stages and determine the flow control stages upon determining that the fuel cell enters the flow control mode, and control an RPM of the air blower according to the determined flow control stages by controlling an amount of air supplied to the fuel cell.

19. A non-transitory computer readable medium containing program instructions executed by a processor, the computer readable medium comprising:
   program instructions that determine whether or not a fuel cell enters a flow control mode including a plurality of flow control stages when flow of the fuel cell is lower than a preset value;
   program instructions that determine the flow control stages, upon determining that the fuel cell enters the flow control mode; and
   program instructions that control a power generation quantity of the fuel cell according to the determined flow control stages, by controlling an amount of air supplied to the fuel cell.

* * * * *